US008333908B2

(12) United States Patent
Tafu et al.

(10) Patent No.: US 8,333,908 B2

(45) Date of Patent: Dec. 18, 2012

(54) FLUORINE INSOLUBILIZERS AND METHODS OF PRODUCING SAME

(75) Inventors: Masamoto Tafu, Toyama (JP); Tetsuji Chohji, Toyama (JP); Takeshi Toshima, Toyama (JP); Takumi Fujita, Mie-gun (JP); Hirokazu Nakano, Mie-gun (JP); Ichiro Morioka, Mie-gun (JP); Katsumi Mori, Mie-gun (JP); Makoto Maeda, Mie-gun (JP); Kazumasa Takenaka, Mie-gun (JP)

(73) Assignee: Chiyoda Ute Co., Ltd., Yokkaichi-shi, Mie-ken (JP)

( * ) Notice: Subject to any disclaimer, the term of this patent is extended or adjusted under 35 U.S.C. 154(b) by 42 days.

(21) Appl. No.: 13/100,480

(22) Filed: May 4, 2011

(65) Prior Publication Data

US 2011/0272638 A1 Nov. 10, 2011

(30) Foreign Application Priority Data

May 10, 2010 (JP) ................................ 2010-108542
Sep. 7, 2010 (JP) ................................ 2010-199480

(51) Int. Cl.

| | |
|---|---|
| ***C09K 3/00*** | (2006.01) |
| *B09B 3/00* | (2006.01) |
| *F23D 14/00* | (2006.01) |
| *F23G 5/00* | (2006.01) |
| *F23G 7/00* | (2006.01) |

(52) U.S. Cl. ..... 252/380; 110/235; 110/236; 405/128.5; 405/128.9

(58) Field of Classification Search .................. 252/380; 210/712, 209, 714; 405/128.5, 128.9; 110/235, 110/236; 204/157.43
See application file for complete search history.

(56) References Cited

FOREIGN PATENT DOCUMENTS

| | | |
|---|---|---|
| JP | 2005-305387 | * 11/2005 |
| JP | 2007-216156 | * 8/2007 |

* cited by examiner

*Primary Examiner* — Bijan Ahvazi
(74) *Attorney, Agent, or Firm* — Weaver Austin Villeneuve & Sampson LLP

(57) ABSTRACT

A fluorine insolubilizer capable of sufficiently insolubilizing fluorine within a short time contains calcium hydrogen phosphate dihydrate in an amount of 95-40 mass % and hydroxy or hydroxyl apatite in an amount of 5-60 mass % for a total of 100 mass %.

15 Claims, 5 Drawing Sheets

FLUORINE INSOLUBILIZERS AND METHODS OF PRODUCING SAME

This application claims priority based on Japanese Patent Applications 2010-108542 filed May 10, 2010 and 2010-199480 filed Sep. 7, 2010.

BACKGROUND OF THE INVENTION

This invention relates to fluorine insolubilizing agents (hereinafter referred to as fluorine insolubilizers) and methods of producing them. It has been a common practice to use a fluorine insolubilizer to insolubilize fluorine in soil or drainage and also in waste gypsum for the purpose of environmental preservation. This invention relates to such fluorine insolubilizers and improvements in their production methods.

Examples of conventionally known fluorine insolubilizer include not only aluminum compounds and calcium compounds of many kinds but also phosphates of various kinds such as sodium phosphate ($Na_3PO_4$), disodium hydrogen phosphate ($Na_2HPO_4$), sodium dihydrogen phosphate ($NaH_2PO_4$), calcium hydrogen phosphate dihydrate ($CaHPO_4.2H_2O$), hydroxy or hydroxyl apatite ($Ca_5(PO_4)_3OH$), as disclosed, for example, in Japanese Patent Publications Tokkai 2005-305387, 2006-341196, 2007-216156 and 2010-53266, Journal of the European Ceramic Society 26 (2006) 767-770 and Bunseki Kagaku 34 (1985) 732-735.

These conventional fluorine insolubilizers, however, have problems in that their ability to insolubilize fluorine is not sufficient and especially that they take too long a time for insolubilizing fluorine.

SUMMARY OF THE INVENTION

It is therefore an object of this invention to provide fluorine insolubilizers capable of insolubilizing fluorine sufficiently in a short time and methods of producing such fluorine insolubilizers.

The present invention for accomplishing the aforementioned objects relates to fluorine insolubilizers characterizing as comprising calcium hydrogen phosphate dihydrate in an amount of 95-40 mass % and hydroxy or hydroxyl apatite in an amount of 5-60 mass % for a total of 100 mass %. This invention also relates to a method of producing such a fluorine insolubilizer characterized as comprising the steps of gradually adding an aqueous solution of phosphoric acid with stirring to an aqueous dispersion of hydrated lime by taking 5 minutes or more such that their molar ratio (phosphoric acid/hydrated lime) would be 1/1-1/1.5, thereby causing a reaction, and separating a solid component from this reaction system.

DETAILED DESCRIPTION OF THE INVENTION

Figure 1:
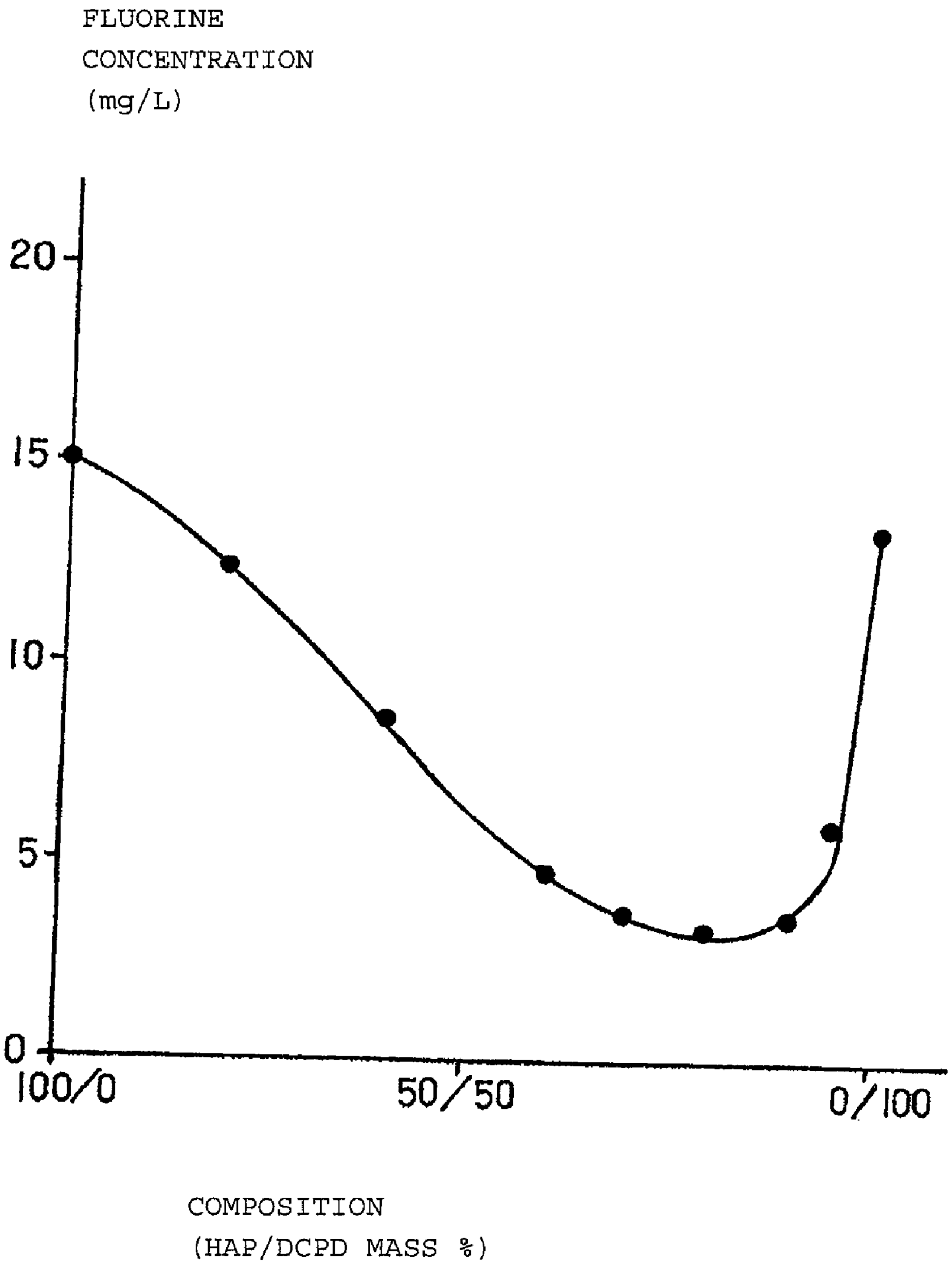
FIG. 1 is a graph that shows the performance characteristic of a fluorine insolubilizer of this invention.

Fluorine insolubilizers according to this invention are explained first. Fluorine insolubilizers according to this invention are characterized as comprising calcium hydrogen phosphate dihydrate (hereinafter simply referred to as DCPD) and hydroxy or hydroxyl apatite (hereinafter simply referred to as HAP).

Since various kinds of DCPD not only for industrial use but also for cosmetics, additives to food items and medical use are commercially available, they may be used for fluorine insolubilizers according to this invention, but those specially produced may also be used. DCPD for industrial use is usually produced by causing an aqueous solution of hydrated lime and phosphoric acid to react within an aqueous medium adjusted to pH4-5, and since methods of using various additives in such a reaction have been known (as disclosed in Japanese Patent Publications Tokkai 63-215505, 6-191808, 6-298505, 7-2504, 7-10511 and 8-165108), those made by such known methods may be utilized.

As for HAP, since many kinds of HAP of various grades including both those naturally available and those chemically synthesized are commercially obtainable, they may be usable for fluorine insolubilizers of this invention but those specially manufactured may also be used. Industrially, HAP is usually produced by mixing an aqueous solution of calcium salts such as an aqueous solution of calcium nitrite with an aqueous solution of phosphoric acid and adjusting its pH to about 8-9. Those produced by such a conventional method may also be used.

According to tests carried out by the inventors herein, DCPD possesses a fair capability of fluorine insolubilization although not quite sufficient but the fluorine insolubilization capability of HAP is lower than fluorine insolubilization of DCPD. If DCPD and HAP are used at a specific ratio, however, a high level of fluorine insolubilization capability not predictable from that of not only HAP but also that of DCPD can be obtained. This is because if DCPD and HAP are used at this specific ratio, both work synergistically, converting fluorine sufficiently into apatite fluoride in a short time so as to insolubilize it.

Fluorine insolubilizers according to this invention are characterized as comprising DCPD in an amount of 95-40 mass % and HAP in an amount of 5-60 mass % for a total of 100 mass %. If DCPD and HAP are used together at this ratio, fluorine can be sufficiently converted into apatite fluoride and insolubilized. For a similar reason, fluorine insolubilizers according to this invention comprising DCPD in an amount of 90-60 mass % and HAP in an amount of 10-40 mass % for a total of 100 mass % are preferable and those comprising DCPD in an amount of 90-80 mass % and HAP in an amount of 10-20 mass % for a total of 100 mass % are even more preferable. In either case, it does not particularly matter if some other components which inevitably come to be included during the course of production of DCPD and HAP are also included.

For the fluorine insolubilizers according to this invention, DCPD is crystalline but HAP may be crystalline or non-crystalline. Their crystalline characteristics can be ascertained by X-ray diffraction (XRD), thermogravimetry/differential thermoanalysis (TG/DTA) and scanning electron microscopic (SEM) observation. For the fluorine insolubilizers according to this invention, non-crystalline HAP is preferable because fluorine insolubilizers with higher capability can be obtained than if crystalline HAP is used.

Next, methods of producing fluorine insolubilizers according to this invention (hereinafter referred to as the methods of this invention) will be explained. Although fluorine insolubilizers according to this invention can be produced by mixing commercially available DCPD with commercially available HAP at a specific ratio described above, it is preferable to produce them according to a method of this invention because fluorine insolubilizers with improved capability can be obtained. According to a method of this invention, hydrated lime ($Ca(OH)_2$) and phosphoric acid ($H_3PO_4$) are caused to react in an aqueous medium. According to a method of this invention, hydrated lime is used under a limited condition for obtaining fluorine insolubilizers always under a stable condition. As for phosphoric acid, not only those of a so-called agent-level and those for food additives but also industrial phosphoric acid with a lower purity as well as waste phosphoric acid may be used.

According to a method of this invention, as described above, hydrated lime and phosphoric acid are caused to react in an aqueous medium. This reaction is caused by gradually adding an aqueous solution of phosphoric acid to an aqueous dispersion (aqueous suspension) of hydrated lime with stirring for 5 minutes or more. The sequence and time of addition when causing the reaction between both are important because a fluorine insolubilizer of a high capability cannot be obtained by adding an aqueous dispersion of hydrated lime to an aqueous solution of phosphoric acid. When an aqueous solution of phosphoric acid is added to an aqueous dispersion of hydrated lime, too, a fluorine insolubilizer of a high capability cannot be obtained if the total amount of the aqueous solution of phosphoric acid is added all at once. According to a method of this invention, as explained above, an aqueous solution of phosphoric acid is added gradually to an aqueous dispersion of hydrated lime with stirring over 5 minutes, and more preferably slowly by taking 20-60 minutes.

According to a method of this invention, as explained above, an aqueous solution of phosphoric acid is added gradually to an aqueous dispersion of hydrated lime with stirring over 5 minutes at a molar ratio (phosphoric acid/hydrated lime) of 1/1-1/1.5 for causing a reaction. A fluorine insolubilizer of a high capability can be obtained by thus gradually adding an aqueous solution of phosphoric acid to an aqueous dispersion of hydrated lime at a molar ratio of 1/1-1/1.5 and more preferably at a molar ratio of 1/1.1-1/1.2.

There is no particular limitation imposed on the concentration of the aqueous dispersion of hydrated lime or the concentration of the aqueous solution of phosphoric acid to be used but it is preferable to use an aqueous solution of hydrated lime with molar concentration of 0.3-3 mols/$dm^3$ and an aqueous solution of phosphoric acid with molar concentration of 0.5-10 mols/$dm^3$. When they are caused to react, temperature is usually set at 70° C. or below but it is preferable to set it at 10-40° C. This is for obtaining a fluorine insolubilizer of a high capability.

Neither does this invention impose any particular limitation on the pH value for the reaction between hydrated lime and phosphoric acid in an aqueous medium but it is preferable to adjust the pH value of the reaction system after the reaction to 4.50-8.00, more preferably to 5.00-7.50 and even more preferably to 5.50-7.00. If the pH of the reaction system is 4.50-8.00 after the reaction, there is no need to newly adjust it but if otherwise, a fluorine insolubilizer of a high capability can be obtained by adding an alkaline aqueous solution such as an aqueous solution of sodium hydroxide to adjust the pH as described above.

After a reaction is caused by gradually adding an aqueous solution of phosphoric acid to an aqueous dispersion of hydrated lime with stirring according to a method of this invention, a solid component is separated from the reaction system by filtration or by centrifugation. The separated solid component is washed with water and dried, if necessary, to obtain a fluorine insolubilizer.

Fluorine insolubilizers obtained by a method of this invention have a high fluorine insolubilization capability, sufficiently insolubilizing fluorine in soil, drainage and waste materials such as discarded gypsum in a short time, insolubilizing as apatite fluoride. The reason for the high fluorine insolubilization capability of fluorine insolubilizers obtained by a method of this invention is believed to be that DCPD with fine and complicated surface structure and non-crystalline HAP are generated simultaneously at the ratio of the fluorine insolubilizers according to this invention such that they act synergistically for insolubilizing fluorine.

Fluorine insolubilizers according to this invention have the merits of sufficiently insolubilizing fluorine in soil, drainage and waste materials in a short time.

In what follows, the invention will be described in terms of test examples but they are not intended to limit the scope of the invention. In the following test examples and comparison examples, "part" will mean "mass part" and "%" will mean "mass %".

Part 1

Comparison Example 1

Commercially available DCPD for industrial use (Daini Rinsan Calcium (tradename) produced by Nippon Kagaku Kogyo) was used as fluorine insolubilizer.

Test Examples 1-6 and Comparison Example 2

The same DCPD for industrial use used in Comparison Example 1 and synthesized non-crystalline HAP were mixed at the ratios of 95/5, 90/10, 80/20, 70/30, 60/40, 40/60 and 20/80 (in %) and each mixture was used as fluorine insolubilizer. In the above, the synthesized non-crystalline HAP was obtained as follows. An aqueous dispersion of hydrated lime (0.835 mols as hydrated lime) was placed inside a reactor vessel and after an aqueous solution of phosphoric acid (0.50 mols as phosphoric acid) was gradually added to it over 30 minutes by using a constant rate pump with stirring, the stirring was further continued for 30 minutes. The temperature of the reaction system was 30° C., pH was 7.00 and the molar ratio of phosphoric acid to hydrated lime was 1/1.67. The reaction system was filtered and the solid component separated by filtration was dried. The dried object was analyzed by X-ray diffraction and thermogravimetry/differential thermoanalysis and found to be non-crystalline HAP.

Comparison Example 3

Non-crystalline HAP synthesized as in Test Examples 1-6 and Comparison Example 2 was used as fluorine insolubilizer.

Evaluation 1

Each of the fluorine insolubilizers prepared for the examples in Part 1 0.5 g was added to an aqueous solution 500 ml with fluorine density 20.0 mg/L prepared by using a commercially available fluorine liquid and they were mixed together at 25° C. for one hour or six hours. Each mixture was suction-filtered and the fluorine concentration of the filtered liquid was obtained by ion chromatograph. Details of each fluorine insolubilizer and the test results are shown together in Table 1. The test results are also shown in FIG. 1. On the horizontal axis of FIG. 1, the mass % of 100/0 corresponds to Comparison 3 and that of 0/100 corresponds to Comparison Example 1.

TABLE 1

| | Composition | | Fluorine concentration (mg/L) | | | |
|---|---|---|---|---|---|---|
| | DCPD | HAP | Reaction time (hour) | | | |
| | (%) | (%) | 0 | 1 | 6 | Evaluation |
| CE-1 | 100 | 0 | 20.0 | 13.3 | 1.21 | C |
| TE-1 | 95 | 5 | 20.0 | 6.00 | 1.55 | B |
| TE-2 | 90 | 10 | 20.0 | 3.68 | 1.33 | A |
| TE-3 | 80 | 20 | 20.0 | 3.44 | 1.33 | A |
| TE-4 | 70 | 30 | 20.0 | 3.87 | 1.63 | A |
| TE-5 | 60 | 40 | 20.0 | 4.85 | 1.97 | A |
| TE-6 | 40 | 60 | 20.0 | 8.70 | 3.65 | B |
| CE-2 | 20 | 80 | 20.0 | 12.3 | 7.78 | C |
| CE-3 | 0 | 100 | 20.0 | 15.0 | 12.7 | C |

In Table 1:

A: Fluorine concentration was less than 5.0 mg/L after one hour and less than 3.0 mg/L after six hours B: Fluorine concentration was less than 10.0 mg/L after one hour and less than 5.0 mg/L after six hours C: Fluorine concentration was 10.0 mg/L or more after one hour Part 2:

Comparison Example 4

Commercially available DCPD for use as food additive (Rinsan-Suiso Calcium (tradename) produced by Taihei Kagaku Sangyosha) was used as fluorine insolubilizer.

Test Examples 7-12 and Comparison Example 5

The same DCPD for use as food additive used in Comparison Example 4 and synthesized non-crystalline HAP were mixed at the ratios of 95/5, 90/10, 80/20, 70/30, 60/40, 40/60 and 20/80 (in %) and each mixture was used as fluorine insolubilizer. In the above, the synthesized non-crystalline HAP was obtained as follows. An aqueous dispersion of hydrated lime (0.835 mols as hydrated lime) was placed inside a reactor vessel and after an aqueous solution of phosphoric acid (0.50 mols as phosphoric acid) was gradually added to it over 30 minutes by using a constant rate pump with stirring, the stirring was further continued for 30 minutes. The temperature of the reaction system was 30° C., pH was 7.00 and the molar ratio of phosphoric acid to hydrated lime was 1/1.67. The reaction system was filtered and the solid component separated by filtration was dried. The dried object was analyzed by X-ray diffraction and thermogravimetry/differential thermoanalysis and found to be non-crystalline HAP.

Comparison Example 6

Non-crystalline HAP synthesized as in Test Examples 7-12 and Comparison Example 5 was used as fluorine insolubilizer.

Evaluation 2

Figure 2:
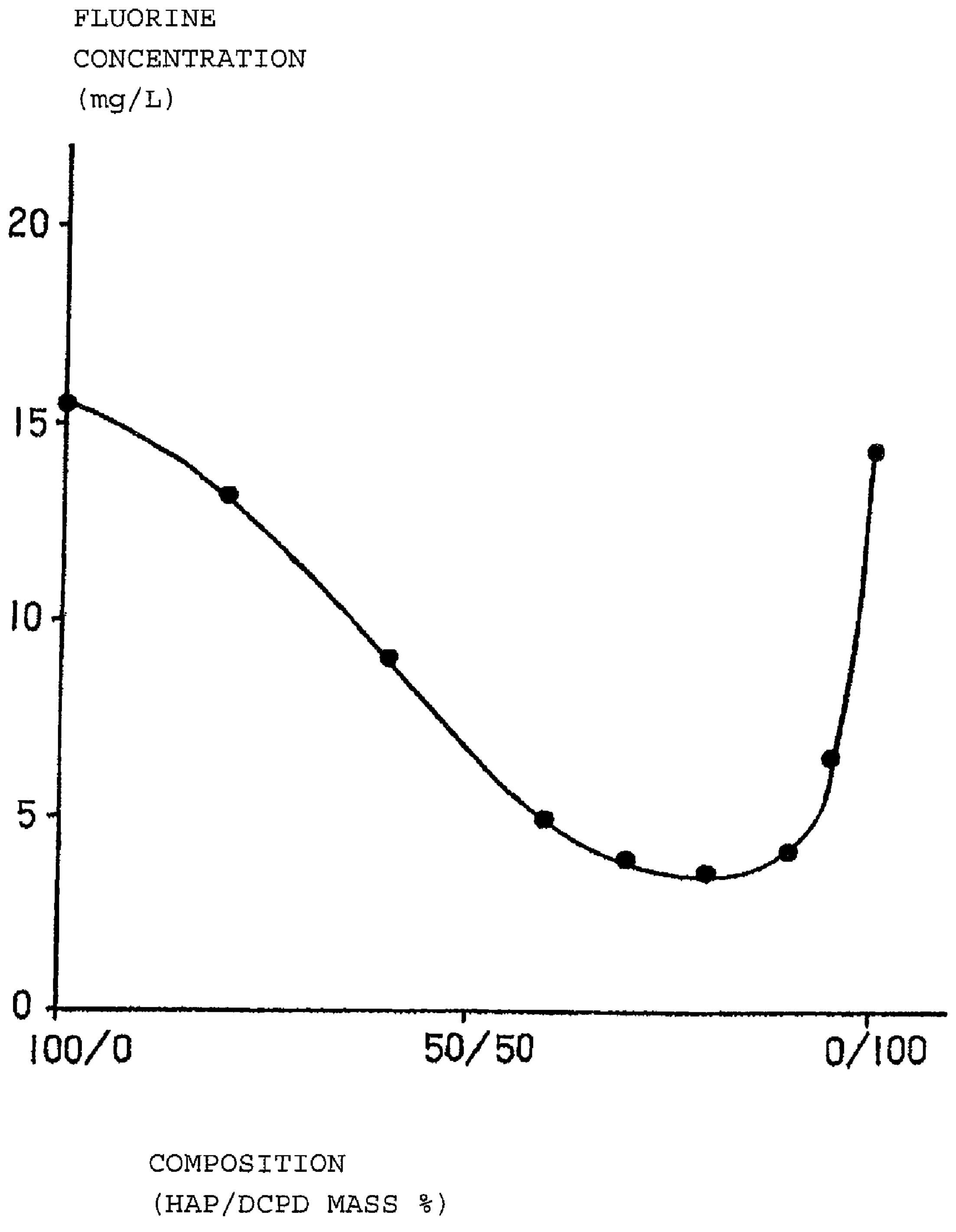
FIG. 2 is a graph that shows the performance characteristic of another fluorine insolubilizer of this invention.

Each fluorine insolubilizer obtained in Part 2 was tested and evaluated as in Part 1. Details of each fluorine insolubilizer and the test results are shown together in Table 2. The test results are also shown in FIG. 2. On the horizontal axis of FIG. 2, the mass % of 100/0 corresponds to Comparison 6 and that of 0/100 corresponds to Comparison Example 4.

TABLE 2

| | Composition | | Fluorine concentration (mg/L) | | | |
|---|---|---|---|---|---|---|
| | DCPD | HAP | Reaction time (hour) | | | |
| | (%) | (%) | 0 | 1 | 6 | Evaluation |
| CE-4 | 100 | 0 | 20.0 | 14.2 | 1.23 | C |
| TE-7 | 95 | 5 | 20.0 | 6.80 | 1.56 | B |
| TE-8 | 90 | 10 | 20.0 | 4.10 | 1.49 | A |
| TE-9 | 80 | 20 | 20.0 | 3.55 | 1.38 | A |
| TE-10 | 70 | 30 | 20.0 | 3.92 | 1.67 | A |
| TE-11 | 60 | 40 | 20.0 | 4.98 | 2.08 | A |
| TE-12 | 40 | 60 | 20.0 | 8.97 | 3.79 | B |
| CE-5 | 20 | 80 | 20.0 | 13.1 | 7.91 | C |
| CE-6 | 0 | 100 | 20.0 | 15.0 | 12.7 | C |

Part 3:

Comparison Example 7

Commercially available DCPD for industrial use (Daini Rinsan Calcium (tradename) produced by Nippon Kagaku Kogyo) was used as fluorine insolubilizer.

Test Examples 13-18 and Comparison Example 8

The same DCPD for industrial use used in Comparison Example 7 and commercially available crystalline HAP were mixed at the ratios of 95/5, 90/10, 80/20, 70/30, 60/40, 40/60 and 20/80 (in %) and each mixture was used as fluorine insolubilizer. As crystalline HAP, HAP-100 (tradename) produced by Taihei Kagaku Sangyosha was used.

Comparison Example 9

Commercially available crystalline HAP as in Test Examples 13-18 and Comparison Example 8 was used as fluorine insolubilizer.

Evaluation 3

Figure 3:
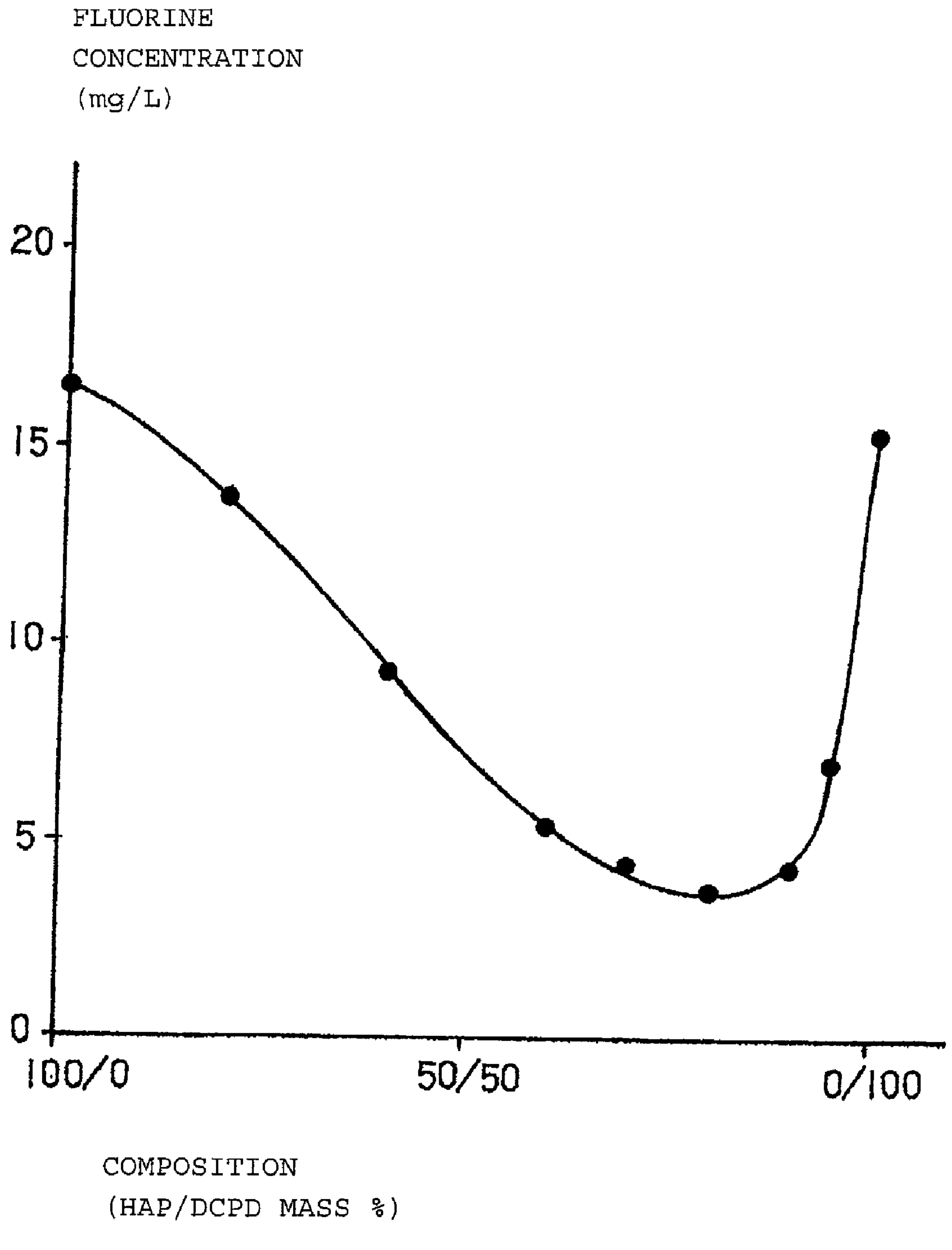
FIG. 3 is a graph that shows the performance characteristic of still another fluorine insolubilizer of this invention.

Each fluorine insolubilizer obtained in Part 3 was tested and evaluated as in Part 1. Details of each fluorine insolubilizer and the test results are shown together in Table 3. The test results are also shown in FIG. 3. On the horizontal axis of FIG. 3, the mass % of 100/0 corresponds to Comparison 9 and that of 0/100 corresponds to Comparison Example 7.

TABLE 3

| | Composition | | Fluorine concentration (mg/L) | | | |
|---|---|---|---|---|---|---|
| | DCPD | HAP | Reaction time (hour) | | | |
| | (%) | (%) | 0 | 1 | 6 | Evaluation |
| CE-7 | 100 | 0 | 20.0 | 13.3 | 1.21 | C |
| TE-13 | 95 | 5 | 20.0 | 7.00 | 2.27 | B |
| TE-14 | 90 | 10 | 20.0 | 4.11 | 1.62 | A |
| TE-15 | 80 | 20 | 20.0 | 3.78 | 1.40 | A |
| TE-16 | 70 | 30 | 20.0 | 4.58 | 2.22 | A |
| TE-17 | 60 | 40 | 20.0 | 4.90 | 2.85 | A |
| TE-18 | 40 | 60 | 20.0 | 9.10 | 4.93 | B |
| CE-8 | 20 | 80 | 20.0 | 13.8 | 11.9 | C |
| CE-9 | 0 | 100 | 20.0 | 17.5 | 16.8 | C |

Part 4:

Comparison Example 10

Commercially available DCPD for use as food additive (Rinsan-Suiso Calcium (tradename) produced by Taihei Kagaku Sangyosha) was used as fluorine insolubilizer.

Test Examples 19-24 and Comparison Example 11

The same DCPD for use as food additive used in Comparison Example 4 and commercially available crystalline HAP were mixed at the ratios of 95/5, 90/10, 80/20, 70/30, 60/40, 40/60 and 20/80 (in %) and each mixture was used as fluorine insolubilizer. As commercially available crystalline HAP, HAP-100 (tradename) produced by Taihei Kagaku Sangyosha was used.

Comparison Example 12

Commercially available crystalline HAP as in Test Examples 19-24 and Comparison Example 11 was used as fluorine insolubilizer.

Evaluation 4

Figure 4:
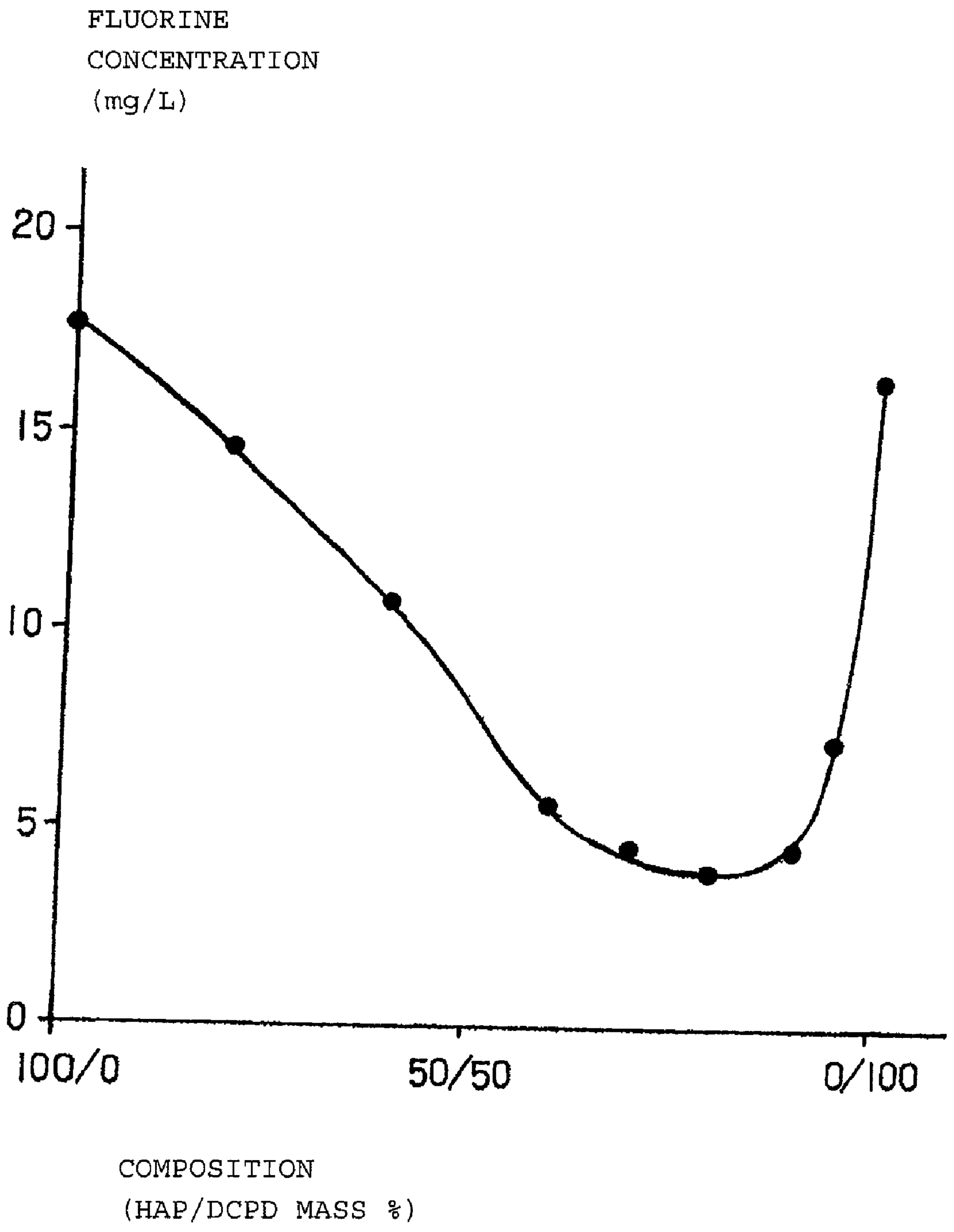
FIG. 4 is a graph that shows the performance characteristic of still another fluorine insolubilizer of this invention.

Each fluorine insolubilizer obtained in Part 4 was tested and evaluated as in Part 1. Details of each fluorine insolubilizer and the test results are shown together in Table 4. The test results are also shown in FIG. 4. On the horizontal axis of FIG. 4, the mass % of 100/0 corresponds to Comparison 12 and that of 0/100 corresponds to Comparison Example 10.

TABLE 4

| | Composition | | Fluorine concentration (mg/L) | | | |
|---|---|---|---|---|---|---|
| | DCPD | HAP | Reaction time (hour) | | | |
| | (%) | (%) | 0 | 1 | 6 | Evaluation |
| CE-10 | 100 | 0 | 20.0 | 14.2 | 1.23 | C |
| TE-19 | 95 | 5 | 20.0 | 7.20 | 2.39 | B |
| TE-20 | 90 | 10 | 20.0 | 4.26 | 1.77 | A |
| TE-21 | 80 | 20 | 20.0 | 3.98 | 1.50 | A |
| TE-22 | 70 | 30 | 20.0 | 4.64 | 2.78 | A |
| TE-23 | 60 | 40 | 20.0 | 4.95 | 2.93 | A |
| TE-24 | 40 | 60 | 20.0 | 9.80 | 4.97 | B |

TABLE 4-continued

| | Composition | | Fluorine concentration (mg/L) | | | |
|---|---|---|---|---|---|---|
| | DCPD | HAP | Reaction time (hour) | | | |
| | (%) | (%) | 0 | 1 | 6 | Evaluation |
| CE-11 | 20 | 80 | 20.0 | 14.5 | 12.1 | C |
| CE-12 | 0 | 100 | 20.0 | 17.5 | 16.8 | C |

Part 5

Comparison Example 13

An aqueous dispersion of hydrated lime (0.60 mols as hydrated lime) was placed in a reaction vessel and after an aqueous solution of phosphoric acid (1.0 mol as phosphoric acid) was gradually added to it over 30 minutes with stirring by using a constant rate pump, the stirring was continued further for 30 minutes. The temperature of the reaction system was 30° C., pH was 4.87 and the molar ratio of phosphoric acid to hydrated lime was 1/0.60. The reaction system was filtered and the solid component separated by filtration was dried. The dried object was analyzed by X-ray diffraction and thermogravimetry/differential thermoanalysis and found to contain DCPD and non-crystalline HAP in a total amount of 95.5% and at a mass ratio (DCPD/Non-crystalline HAP) of 100/0. This dried object was used as fluorine insolubilizer.

Comparison Example 14, Test Examples 25-30 and Comparison Example 15

A reaction was caused by gradually adding an aqueous solution of phosphoric acid to an aqueous dispersion of hydrated lime in the same way as in Comparison Example 13 except that the molar ratio between phosphoric acid and hydrated lime was changed as shown in Table 5. The solid component was separated from the reaction system and dried, and the dried object thus obtained was used as fluorine insolubilizer.

Evaluation 5

Figure 5:
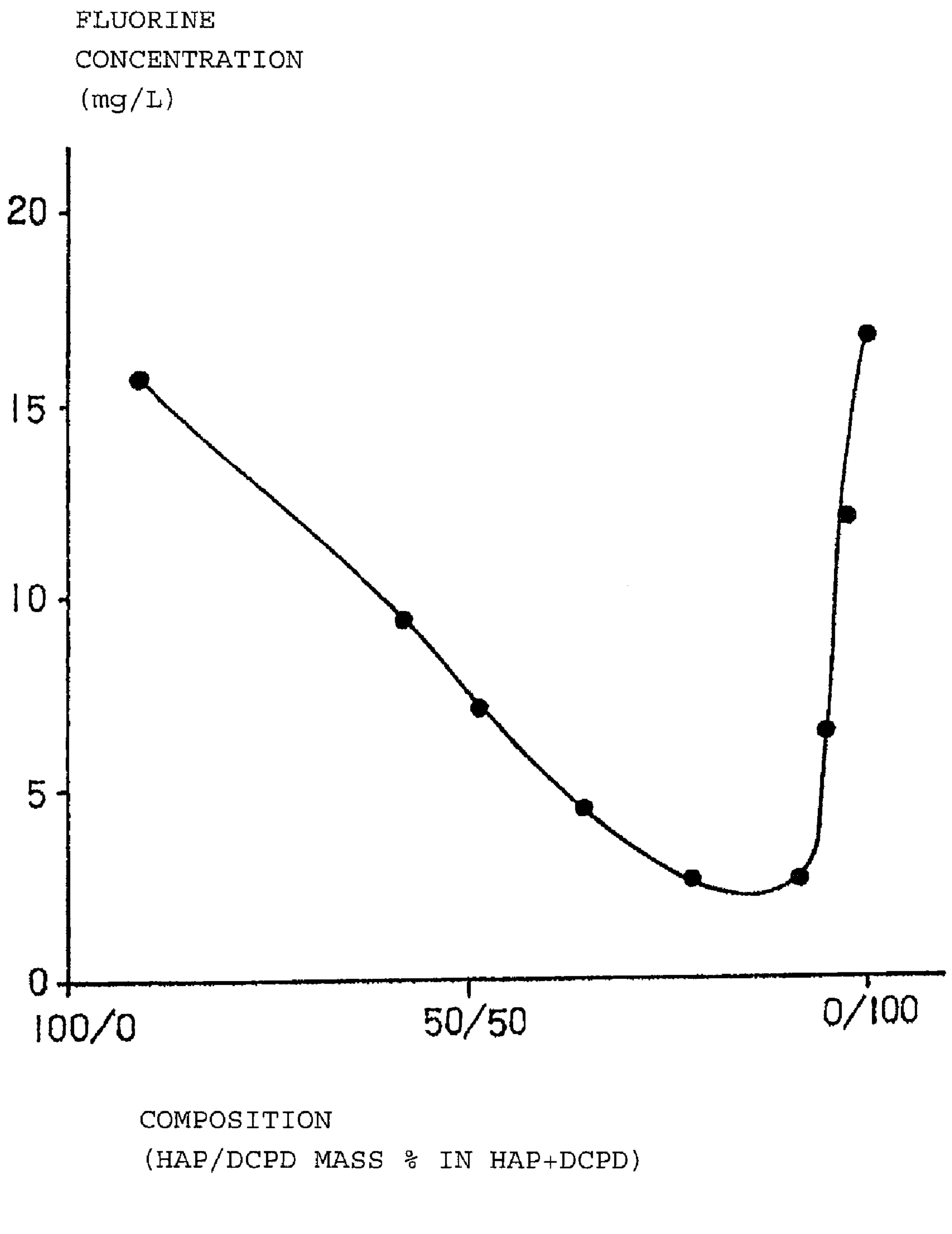
FIG. 5 is a graph that shows the performance characteristic of still another fluorine insolubilizer of this invention.

Each fluorine insolubilizer obtained in Part 5 was tested and evaluated as in Part 1. Details of each fluorine insolubilizer and the test results are shown together in Table 5. The test results are also shown in FIG. 5. On the horizontal axis of FIG. 5, the mass % (HAP+HAP in DCPD/DCPD) of 91.5/8.5 corresponds to Comparison 15 and that of 0/100 corresponds to Comparison Example 13.

TABLE 5

| | Phosphoric acid/ | | Composition in DCPD + HAP | | Fluorine concentration (mg/L) | | | |
|---|---|---|---|---|---|---|---|---|
| | hydrated lime used | Total % of | DCPD | HAP | Reaction time (hour) | | | |
| | (molar ratio) | DCPD + HAP | (%) | (%) | 0 | 1 | 6 | Evaluation |
| CE-13 | 1/0.6 | 95.5 | 100 | 0 | 20.0 | 17.3 | 16.8 | C |
| CE-14 | 1/0.8 | 94.2 | 99.7 | 0.3 | 20.0 | 11.7 | 1.0 | C |
| TE-25 | 1/1.0 | 93.2 | 94.5 | 5.5 | 20.0 | 6.4 | 1.0 | B |
| TE-26 | 1/1.1 | 93.0 | 89.9 | 10.1 | 20.0 | 2.6 | 1.2 | A |
| TE-27 | 1/1.2 | 92.0 | 77.6 | 22.4 | 20.0 | 2.8 | 1.4 | A |
| TE-28 | 1/1.3 | 91.6 | 66.3 | 33.7 | 20.0 | 4.8 | 2.5 | A |
| TE-29 | 1/1.4 | 88.7 | 52.3 | 47.7 | 20.0 | 7.0 | 3.7 | B |
| TE-30 | 1/1.5 | 84.5 | 41.7 | 58.3 | 20.0 | 9.2 | 4.7 | B |
| CE-15 | 1/1.6 | 76.8 | 8.5 | 91.5 | 20.0 | 15.8 | 8.5 | C |

Part 6

Test Example 31

Hydrated lime 55.5 g (0.75 mols as hydrated lime) was dispersed in pure water 300 g to prepare an aqueous dispersion of hydrated lime and placed in a reactor vessel. After an aqueous solution of phosphoric acid of purity 75% for industrial use 65.3 g (0.50 mols as phosphoric acid) was gradually added to this reactor vessel while stirring the aqueous dispersion of hydrated lime inside the reactor vessel by using a constant rate pump for 5 minutes, the stirring was further continued for 60 minutes. The temperature of the reaction system was 30° C., pH was 5.90, and the molar ratio of phosphoric acid to hydrated lime was 1/1.5. The reaction system was filtered and the solid component separated by filtration was dried at 40° C. to obtain a dried object. The dried object was analyzed by X-ray diffraction and thermogravimetry/differential thermoanalysis and found to contain DCPD and non-crystalline HAP in a total amount of 88.0% and at a mass ratio (DCPD/Non-crystalline HAP) of 51.4/36.6. This dried object was used as fluorine insolubilizer.

Test Examples 32-35

Dried objects were obtained similarly as in Test Example 31 except that aqueous solution of phosphoric acid for industrial use was added to aqueous solution of hydrated lime over 10 minutes, 20 minutes, 30 minutes and 45 minutes instead of 5 minutes and these dried objects thus obtained were used as fluorine insolubilizers.

Comparison Example 16

Hydrated lime 55.5 g (0.75 mols as hydrated lime) was dispersed in pure water 300 g to prepare an aqueous dispersion of hydrated lime and placed in a reactor vessel. After an aqueous solution of phosphoric acid of purity 75% for industrial use 65.3 g (0.50 mols as phosphoric acid) was added at once to this reactor vessel while stirring the aqueous dispersion of hydrated lime inside the reactor vessel, the stirring was further continued for 60 minutes. The temperature of the reaction system was 30° C., pH was 6.10, and the molar ratio of phosphoric acid to hydrated lime was 1/1.5. The reaction system was filtered and the solid component separated by filtration was dried at 40° C. to obtain a dried object. The dried object was used as fluorine insolubilizer.

Comparison Example 17

A dried object was obtained similarly as in Test Example 31 except that calcium carbonate 75.1 g (0.75 mols as calcium carbonate) was used instead of hydrated lime 55.5 g (0.75 mols as hydrated lime), and was used as fluorine insolubilizer.

Comparison Example 18

A dried object was obtained similarly as in Comparison Example 16 except that calcium carbonate 75.1 g (0.75 mols as calcium carbonate) was used instead of hydrated lime 55.5 g (0.75 mols as hydrated lime), and was used as fluorine insolubilizer.

Comparison Example 19

Hydrated lime 55.5 g (0.75 mols as hydrated lime) was dispersed in pure water 300 g to prepare an aqueous dispersion of hydrated lime. An aqueous solution of phosphoric acid of purity 75% for industrial use 65.3 g (0.50 mols as phosphoric acid) was placed inside a reactor vessel and after the aforementioned aqueous dispersion of hydrated lime was gradually added to it over 10 minutes by using a constant rate pump while the aqueous dispersion was being stirred, the stirring was further continued for 60 minutes. The temperature of the reaction system was 30° C., pH was 5.90, and the molar ratio of phosphoric acid to hydrated lime was 1/1.5. The reaction system was filtered and the solid component separated by filtration was dried to obtain a dried object. The dried object thus obtained was used as fluorine insolubilizer.

Comparison Example 20

A dried object was obtained similarly as in Comparison Example 19 except that aqueous dispersion of hydrated lime was added to aqueous solution of phosphoric acid over 20 minutes instead of 10 minutes and was used as fluorine insolubilizer.

Evaluation 6

Each fluorine insolubilizer obtained in Part 6 was tested and evaluated as in Part 1. Details and test results of each fluorine insolubilizer are shown together in Table 6.

TABLE 6

| | Kind of Ca salt | Time (min) | Phosphoric acid/hydrated lime used (molar ratio) | pH | Total % of DCPD + HAP | Composition in DCPD + HAP: DCPD (%) | HAP (%) | Fluorine concentration (mg/L), Reaction time (hour): 0 | 1 | 6 | Evaluation |
|---|---|---|---|---|---|---|---|---|---|---|---|
| TE-31 | *1 | 5 | 1/1.5 | 5.90 | 88.0 | 51.4 | 36.6 | 20.0 | 3.8 | 1.2 | A |
| TE-32 | *1 | 10 | 1/1.5 | 5.90 | 87.5 | 51.7 | 35.8 | 20.0 | 2.9 | 1.2 | A |
| TE-33 | *1 | 20 | 1/1.5 | 5.90 | 88.5 | 53.2 | 35.3 | 20.0 | 3.0 | 1.1 | A |
| TE-34 | *1 | 30 | 1/1.5 | 5.95 | 88.7 | 53.8 | 34.9 | 20.0 | 2.9 | 1.1 | A |
| TE-35 | *1 | 45 | 1/1.5 | 6.00 | 89.2 | 55.1 | 34.1 | 20.0 | 2.8 | 1.1 | A |
| CE-16 | *1 | 0 | 1/1.5 | 6.10 | — | — | — | 20.0 | 10.5 | 1.6 | C |
| CE-17 | *2 | 5 | 1/1.5 | 6.35 | — | — | — | 20.0 | 18.9 | 15.3 | C |
| CE-18 | *2 | 0 | 1/1.5 | 6.40 | — | — | — | 20.0 | 19.6 | 16.1 | C |
| CE-19 | *1 | Δ10 | 1/1.5 | 6.05 | — | — | — | 20.0 | 19.1 | 14.9 | C |
| CE-20 | *1 | Δ20 | 1/1.5 | 6.00 | — | — | — | 20.0 | 19.1 | 14.3 | C |

In Table 6:
*1: $Ca(OH)_2$
*2: $CaCO_3$
Δ: Time for gradually adding aqueous dispersion of hydrated lime to aqueous solution of phosphoric acid for industrial use Part 7

Test Example 36

Hydrated lime 46.3 g (0.62 mols as hydrated lime) was dispersed in pure water 300 g to prepare an aqueous dispersion of hydrated lime and placed in a reactor vessel. After an aqueous solution of phosphoric acid of purity 75% for industrial use 65.3 g (0.50 mols as phosphoric acid) was added gradually to this reactor vessel over 20 minutes by using a constant rate pump while stirring the aqueous dispersion of hydrated lime inside the reactor vessel, the stirring was further continued for 60 minutes. The temperature of the reaction system was 30° C., pH was 5.20, and the molar ratio of phosphoric acid to hydrated lime was 1/1.24. After an aqueous solution of sodium hydroxide was added to the reaction system to adjust its pH to 6.50, the reaction system was filtered and the solid component separated by filtration was dried at 40° C. to obtain a dried object. The dried object was analyzed by X-ray diffraction and thermogravimetry/differential thermoanalysis and found to contain DCPD and non-crystalline HAP in a total amount of 91.0% and at a mass ratio (DCPD/Non-crystalline HAP) of 55.2/35.8. This dried object was used as fluorine insolubilizer.

Test Example 37

A dried object was obtained similarly as in Test Example 36 except that hydrated lime 46.3 g (0.62 mols as hydrated lime) was used instead of hydrated lime 55.5 g (0.75 mols), and was used as fluorine insolubilizer.

Test Examples 38-40

Dried objects were obtained similarly as in Test Example 37 except that the pH value of the reaction system was adjusted to 5.50, 7.00 and 8.00, instead of 6.50, and were used as fluorine insolubilizers.

Comparison Example 21

A dried object was obtained similarly as in Test Example 36 except that hydrated lime 28.1 g (0.38 mols as hydrated lime) was used instead of hydrated lime 46.3 g (0.62 mols), and was used as fluorine insolubilizer.

Evaluation 7

Each fluorine insolubilizer obtained in Part 7 was tested and evaluated as in Part 1. Details and test results of each fluorine insolubilizer are shown together in Table 7.

TABLE 7

| | Time (min) | Phosphoric acid/hydrated lime used (molar ratio) | pH | Composition in DCPD + HAP: Total % of DCPD + HAP | DCPD (%) | HAP (%) | Fluorine concentration (mg/L): After 1 hour | After 6 hours | Evaluation |
|---|---|---|---|---|---|---|---|---|---|
| TE-36 | 20 | 1/1.24 | 6.50 | 91.0 | 55.2 | 35.8 | 2.9 | 1.1 | A |
| TE-37 | 20 | 1/1.5 | 6.50 | 91.5 | 56.1 | 35.4 | 2.9 | 1.0 | A |
| TE-38 | 20 | 1/1.5 | 5.50 | 91.8 | 56.0 | 35.8 | 2.9 | 1.0 | A |
| TE-39 | 20 | 1/1.5 | 7.00 | 91.0 | 55.3 | 35.7 | 2.9 | 1.1 | A |
| TE-40 | 20 | 1/1.5 | 8.00 | 89.6 | 54.1 | 35.5 | 3.4 | 1.2 | A |
| CE-21 | 20 | 1/6.76 | 6.50 | — | — | — | 19.8 | 19.8 | C |

As can be understood from the results of Tables 1-7, fluorine insolubilizers of each Test Example according to this invention can insolubilize fluorine within such a short time as one hour to an elution concentration as low as 10 mg/L or less and preferably 5 mg/L or less.

What is claimed is:

1. A fluorine insolubilizer comprising calcium hydrogen phosphate dihydrate in an amount of 95-40 mass % and hydroxy or hydroxyl apatite in an amount of 5-60 mass % for a total of 100 mass %, wherein the hydroxyl apatite is non-crystalline.

2. The fluorine insolubilizer of claim 1 comprising calcium hydrogen phosphate dihydrate in an amount of 90-60 mass % and hydroxyl apatite in an amount of 10-40 mass % for a total of 100 mass %.

3. The fluorine insolubilizer of claim 2 wherein the hydroxyl apatite is non-crystalline.

4. The fluorine insolubilizer of claim 2 wherein the hydroxyl apatite is crystalline.

5. The fluorine insolubilizer of claim 1 comprising calcium hydrogen phosphate dihydrate in an amount of 90-80 mass % and hydroxyl apatite in an amount of 10-20 mass % for a total of 100 mass %.

6. The fluorine insolubilizer of claim 3 wherein the hydroxyl apatite is non-crystalline.

7. The fluorine insolubilizer of claim 5 wherein the hydroxyl apatite is crystalline.

8. The fluorine insolubilizer of claim 1 wherein the hydroxyl apatite is non-crystalline.

9. The fluorine insolubilizer of claim 1 wherein the hydroxyl apatite is crystalline.

10. A method of producing fluorine insolubilizer, said method comprising the steps of:

causing a reaction by adding an aqueous solution of phosphoric acid gradually over 5 minutes or more to an aqueous dispersion of hydrated lime while stirring such that the phosphoric acid and the hydrated lime will have a molar ratio of 1/1-1/1.5; and separating from reaction system of said reaction a solid component that contains calcium hydrogen phosphate dihydrate in an amount of 95-40 mass % and hydroxyl apatite in an amount of 5-60 mass % for a total of 100 mass %.

11. The method of claim 10 wherein the aqueous solution of phosphoric acid is gradually added over 20-60 minutes to the aqueous dispersion of hydrated lime.

12. The method of claim 11 wherein the aqueous solution of phosphoric acid is gradually added to the aqueous dispersion of hydrated lime such that the phosphoric acid and the hydrated lime will have a molar ratio of 1/1.1-1/1.2.

13. The method of claim 12 wherein the aqueous dispersion of hydrated lime has molar concentration in the range of 0.3-3 mols/$dm^3$ and the aqueous solution of phosphoric acid has molar concentration in the range of 0.5-10 mols/$dm^3$.

14. The method of claim 13 further comprising the step of adjusting the pH value of reaction system to 4.50-8.00 after causing a reaction by adding the aqueous solution of phosphoric acid to the aqueous dispersion of hydrated lime.

15. The method of claim 14 wherein the reaction is caused under a condition of temperature in the range of 10-40° C.

* * * * *